Nov. 7, 1950  F. A. GUTH ET AL  2,529,386
VEHICLE ACTUATED GATE
Filed Dec. 4, 1946  3 Sheets-Sheet 1
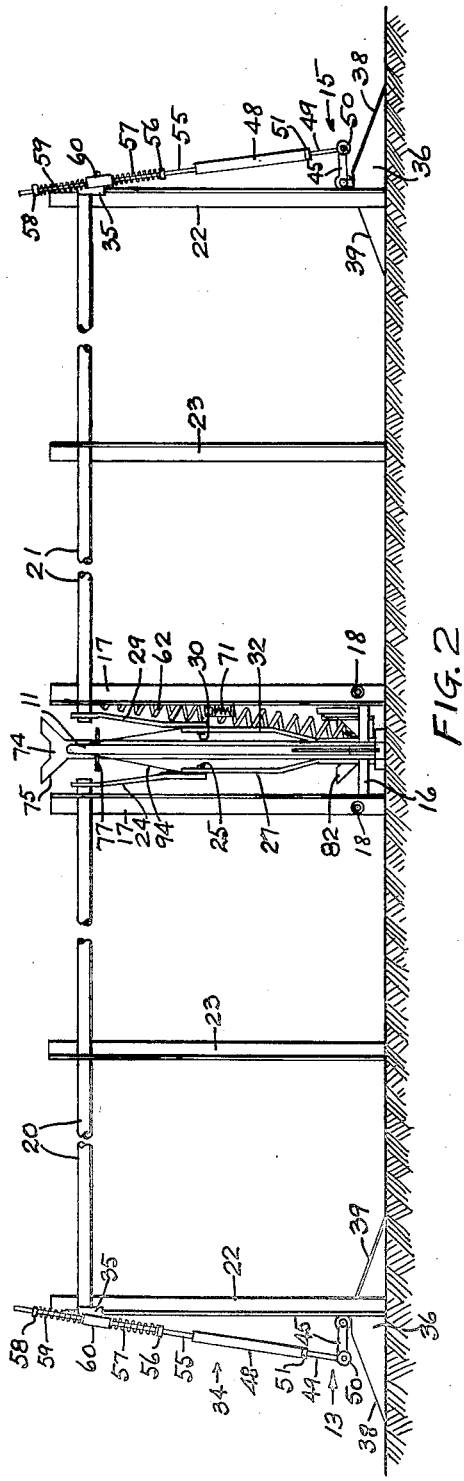
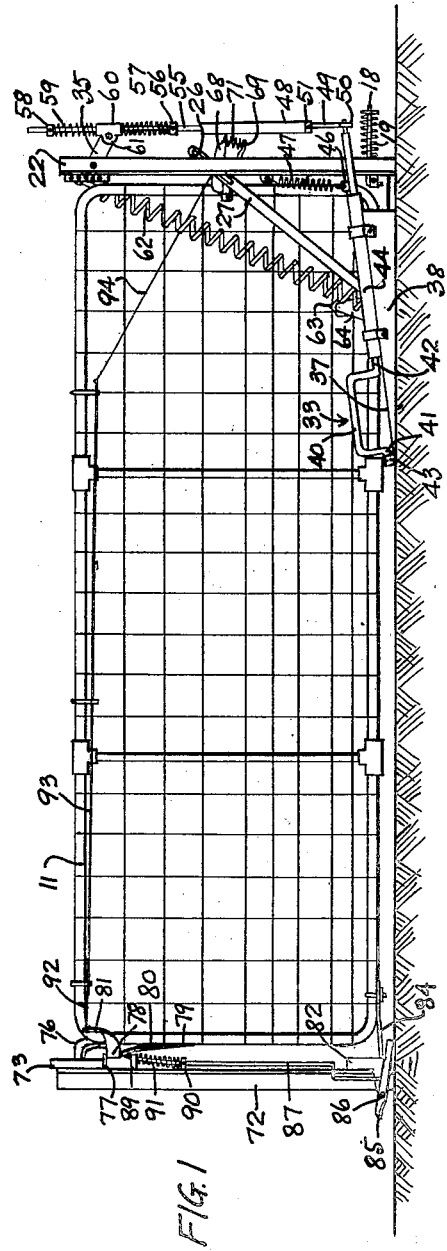
INVENTORS
FREDERICK A. GUTH
HAROLD F. GUTH
BY Weatherford and Weatherford attys

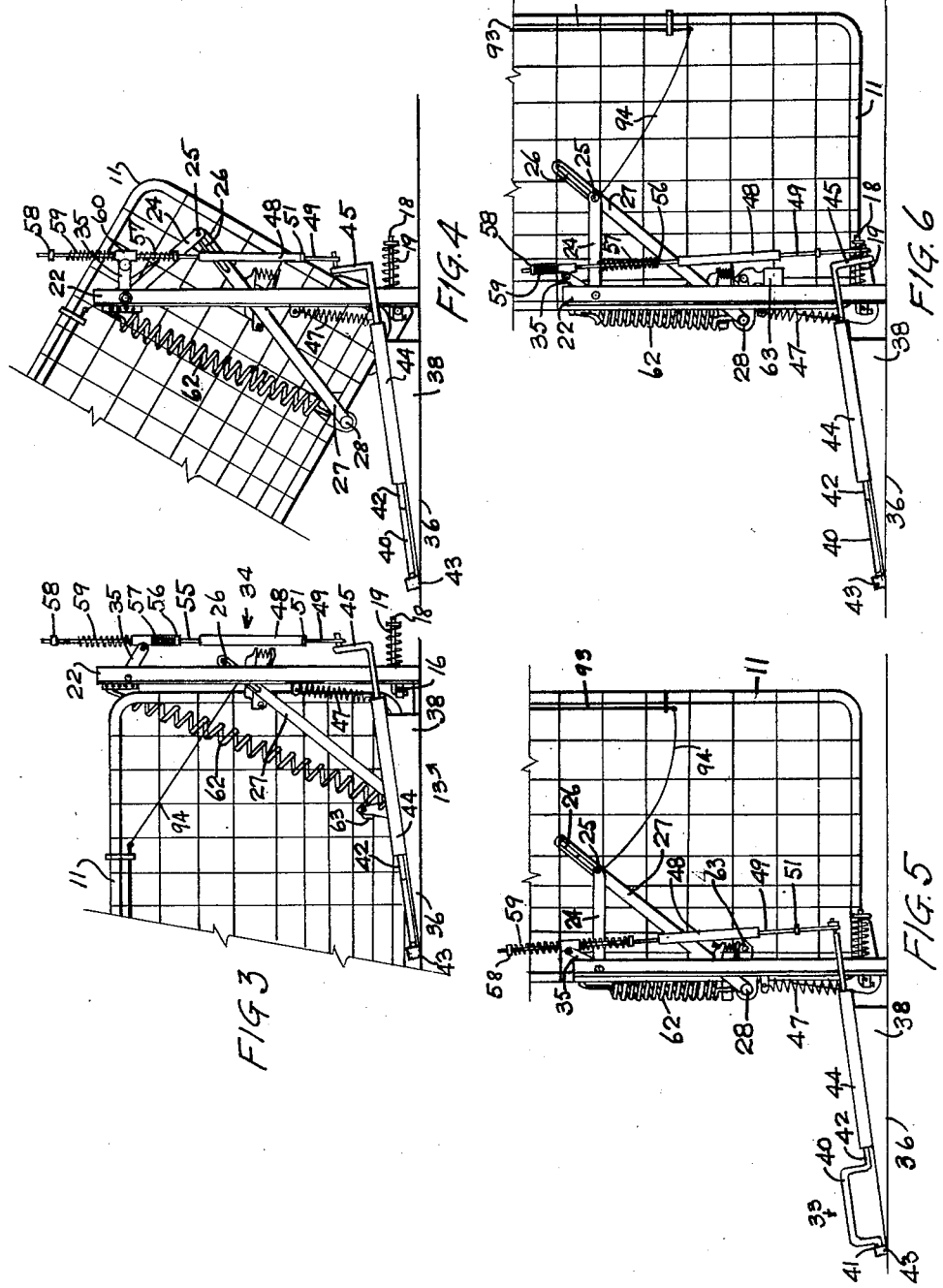

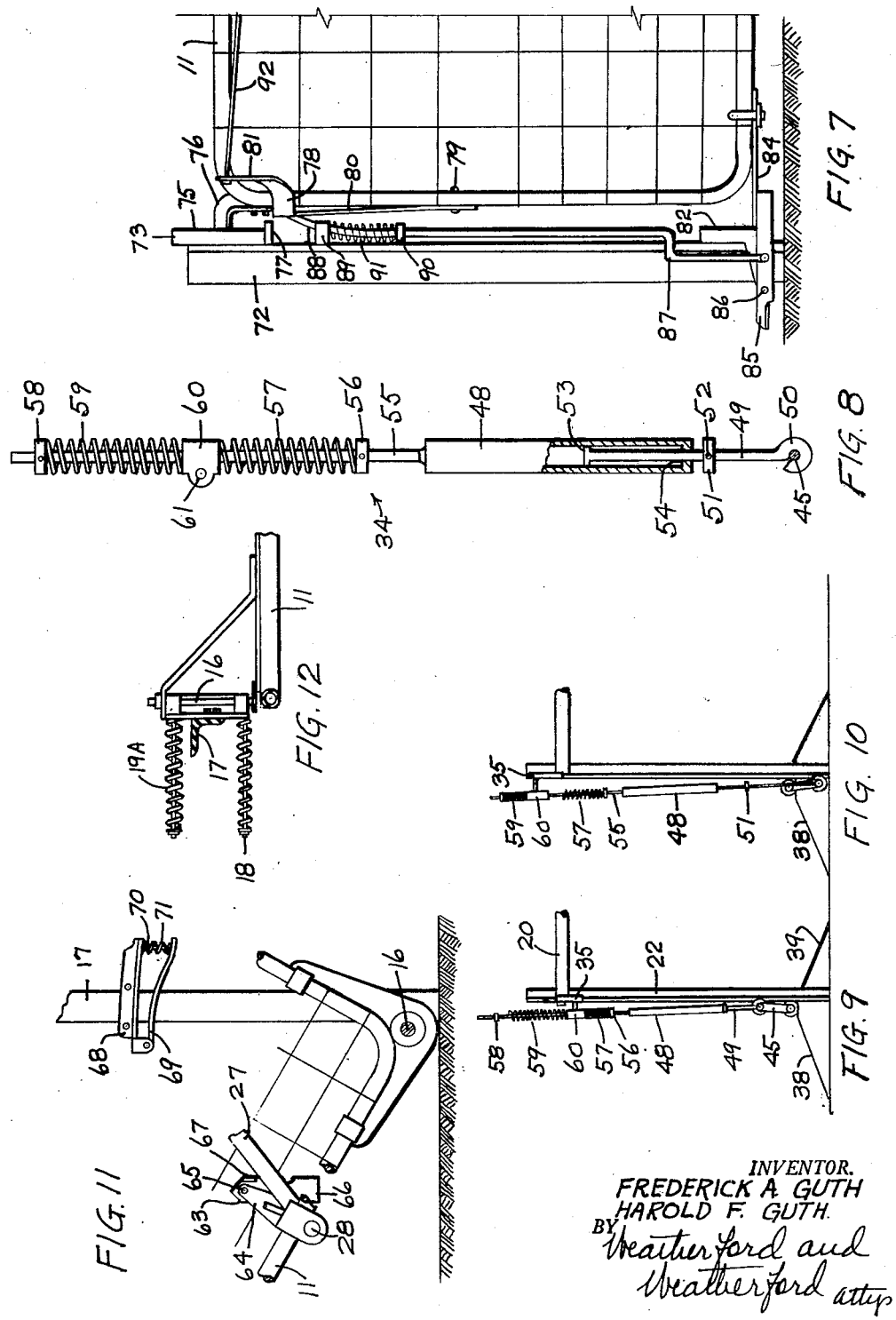

Patented Nov. 7, 1950

2,529,386

UNITED STATES PATENT OFFICE 2,529,386

VEHICLE ACTUATED GATE

Frederick A. Guth, Waverly, Ohio, and Harold F. Guth, Memphis, Tenn.

Application December 4, 1946, Serial No. 713,876

9 Claims. (Cl. 39—43)

This invention relates to new and useful improvements in gates and particularly relates to vehicle operated semi-automatic gates.

It is highly desirable, particularly in rural areas to provide fences, which have gaps as for the passage of roadways, with gates for effecting closure of said gaps, and it has long been recognized that such gates should be provided with mechanism for conveniently operating the gates to effect opening and closing thereof which should be positioned at a distance from the gate and in a position for convenient operation from a vehicle approaching the gate and departing therefrom.

Means for operating gates by the passage of vehicles have been heretofore known, but these prior vehicle-operated gates have presented the difficulty of essentially utilizing chains or cables or the like which have received through various mechanisms the abrupt force imparted by the passage of a vehicle, which inherently directly affects the cables and results in an early and undesired destruction of the utility thereof.

The primary object of the present invention is to provide a gap-closing gate which may be opened by the passage of a vehicle approaching the gate and which will be closed by the departure of that vehicle from the gate, in which the operating mechanism utilizes essentially a crank shaft and coupling rod for imparting gate moving force.

A further object of the invention is to provide a vertically moving remote controlled gate in which the vertical movement is assisted by a counterbalance spring.

A further object of the invention is to provide a gate with an approach mechanism operable by the passage of the wheels of a vehicle thereover in which the operating mechanism is rendered temporarily inoperable during gate opening movement, but is reset for operation during completion of said gate opening movement.

And a further object of the invention is to generally improve the design, utility and efficiency of vehicle operated gates.

The means by which the foregoing and other objects are accomplished and the manner of their accomplishment will be readily understood from the following specification upon reference to the accompanying drawings, in which:

Fig. 1 is a face view of the gate and operating assembly.

Fig. 2 is a foreshortened side view showing the gate and the approach and departure mechanisms.

Fig. 3 is a fragmentary face view showing the mechanism depressed before movement of the gate has begun.

Fig. 4 is a similar view showing an intermediate stage of movement.

Fig. 5 is a similar view showing the gate full open.

Fig. 6 is a similar view showing the gate full open immediately prior to beginning return movement thereof.

Fig. 7 is a fragmentary view on an enlarged scale showing the details of the latch and release.

Fig. 8 is a view on a further enlarged scale partly in section and partly in elevation showing the details of the composite coupling rod assembly.

Fig. 9 is a fragmentary side view of the actuated assembly showing the relative position of the parts when the mechanism has been first depressed for raising the gate, as in Fig. 3.

Fig. 10 is a similar view for gate closure.

Fig. 11 is a fragmentary view on an enlarged scale showing the pawl and arresting gear; and Fig. 12 is a plan view on an enlarged scale showing the variation of the double spring pivot for use with a single post.

Referring now to the drawings in which the various parts are indicated by numerals:

The device essentially comprises a gate 11 and oppositely disposed actuating mechanisms 13 and 15, each of the actuating mechanisms being respectively adapted for approach and departure actuated movement of the gate. For the purposes of illustration, the actuating mechanism 13 will be hereinafter referred to as the approach mechanism and the actuating mechanism 15 will hereinafter be referred to as the departure mechanism, it being understood that each of the mechanisms may serve either purpose, depending on the direction of travel of the vehicle involved.

The gate 11 is illustrated as comprising a frame having a lattice work of wire or small metal strips attached thereto. The gate is mounted for vertical movement about a gate pivot which comprises a rod 16, the ends of the rod being rotatably housed in suitable bearings which are secured to the gate posts 17, by bolts 18, springs 19 being interposed between each of the bolts and its related gate post to maintain a firm seating of the pivot end adjacent the face of the post.

The actuating mechanisms are each coupled to the gate to effect vertical movement thereof about its pivot, the mechanisms being respectively coupled thereto through elongated horizontally disposed rotatable shafts 20, 21, preferably journalledly supported at their outer ends adjacent the mechanisms by outer posts 22 and at their inner ends adjacent the gate by the gate posts 17. Preferably the shafts are rotatably supported intermediate their length by supplemental posts 23, it being understood that as many of the posts 23 as are necessary may be used for effecting appropriate support of the shafts. At its inner end, between its gate post 17 and the gate 11, the shaft 20 has one end of an arm 24 rigidly and radially secured to it, the opposite end of the arm carrying a pin 25. In normal position the arm 24 is substantially vertically disposed downwardly from shaft 20. The pin 25 is projected through a slot 26 formed adjacent one end of a link 27, the pin being slidable and rotatable within the slot. At its opposite end the link 27 is pivotally secured, as at 28, preferably to the lower portion of the frame of the gate 11, and spaced outwardly along the frame from the gate pivot 16, this spacing being in excess of the length of arm 21.

It will thus be seen that upon rotation of the shaft 20 the arm 24 will be swung thereby, moving the pin 25 through an arc and correspondingly effecting movement of the link 27. When the gate is in lowered position, as shown in Fig. 1, counter-clockwise rotation of the shaft 20 will thus effect an upward movement of the pin 25 and of the link 27 and will consequently move the link pivot 28 upwardly tending to raise the gate about its pivot. When the gate has reached full raised position, such as illustrated in Fig. 5, a clockwise rotation of the shaft 20 will reversely move the parts and tend to move the gate downwardly about its pivot. In similar fashion the mechanism 15 is coupled to the gate through the elongated horizontally disposed rotatable shaft 21, having an arm 29 secured to its inner end, the arm 29 carrying a pin 30 slidably and rotatably disposed in a slot 31 in one end of a link 32, the opposite end of the link 32 being pivotally secured to the lower portion of the frame of the gate 11 on the side opposite to the securing of the link 27 thereto and being spaced from the pivot 16 in manner similar to the spacing of pivot 28 from the pivot 16.

The desired rotational movements of the shafts 20, 21 are respectively effected by their related actuating mechanisms 13 and 15 which are substantially identical. Each actuating mechanism comprises a wheel-operated crank 33 to which is secured a composite connecting rod 34, hereinafter referred to as a pitman, and an upper crank arm 35 rigidly and radially secured to the end of the rotatable shaft adjacent the post 22, and projecting outwardly therefrom. The crank 33 is preferably mounted on a rigid and sloping block 36, preferably of concrete, the inner or roadway edge of the block being substantially flush with the roadway, the outer end of the block being raised at its mid point above the roadway surface to form a ridge 37 and the block being beveled on its forward and rearward surfaces to provide slopes 38, 39.

The crank 33 preferably comprises a normally vertically disposed, substantially U-shaped section 40 and portions 41, 42 oppositely extending from the U-shaped section and being journalled in suitable bearings 43, 44 which are secured to the block 36 substantially along its central ridge. The U-shaped section 40 is disposed in the path of the wheels of one side of a vehicle using the roadway and is oscillatable responsive to the passage of the vehicle wheels thereover. The portion 42 is elongated and extends from the U-shaped portion 40 along the block 36, and, preferably beyond the supporting post 22, at its end remote from the U-shaped section, this elongated portion has rigidly secured to it one end of a crank arm 45, this crank arm normally being preferably substantially horizontally disposed, and being of a length slightly less than the height of the mid point of the outer end of block 36. To the opposite end of the crank arm the lower end of the composite pitman 34 is pivotally secured. Between the bearing 44 and crank arm 45 a normally vertically disposed ear 46 is rigidly secured to portion 42, to which ear one end of a spring 47 is secured, the opposite end of which is secured to post 22, the spring being adapted to urge return of the U-shaped section 40 to its normal vertical position.

The pitman 34 comprises a sleeve 48, in the lower portion of which is slidably disposed a plunger 49 which projects downwardly therefrom and terminates in an eye 50, by which pivotal connection of the pitman to the crank arm 45 is preferably accomplished. The plunger 49, intermediate its length is provided with an adjustable stop to limit upward movement of the plunger through the sleeve, the stop consisting of a collar 51 adjustably secured in position as by a set screw 52. Within the sleeve the plunger is peened as at 53, the peen being adapted to cooperate with the lower shoulder 54 of the sleeve to act as an oppositely disposed stop therefor adapted to limit downward movement therethrough. To the upper end of the sleeve one end of a rod 55 is rigidly secured, this rod being substantially alined with the plunger 49.

Above and spaced from the upper end of the sleeve 48 the rod 55 has adjustably mounted on it an adjustable seat 56, adapted to act as a seat for a compression spring 57 loosely disposed around the rod 55. Adjacent its upper end the rod 55 is provided with an upper adjustable seat 58, adapted to act as an upper seat for a second compression spring 59 loosely disposed around the rod 55. The springs 57, 59 are substantially identical and are of approximate equal strength, although the compression strength of springs 57, 59 preferably exceeds the tension strength of spring 47. Between the springs 57, 59 is interposed a collar 60 which is slidably mounted on the rod 55, the upper surface of the collar 60 being adapted to act as a lower seat for the spring 59 and its lower surface being adapted to act as the upper seat for the spring 57, in each case in cooperation with the opposite spring and the inertia of the gate 11. The collar 60 preferably is provided with an ear 61 which is pivotally secured to the crank arm 35.

A counter-balance spring 62 is adjustably secured at one end to one of the gate posts 17 adjacent the upper end thereof. At its opposite end the counter-balance spring is secured to the lower frame of the gate 11, preferably adjacent the point of pivotal securing of the links 27, 32 thereto. The counter-balance spring 62 urges the gate upwardly and its strength is such as to effect a balance of the gate when it has reached approximately the mid point of its vertical movement so that a very minor force is necessary to be exerted to start the gate upwardly in cooperation with the counter-balance spring, the momentum of the gate as it moves upwardly carrying it past the mid or balance point to the desired full open position. This momentum of the gate, however, would normally create a considerable shock when the gate reached the full open position, the shock being such as would cause undesired damage to the gate and its mechanisms.

For the purpose of reducing the effect of this shock and to permit the gate to smoothly open and come gradually to rest during the final portion of its travel, there is included herein means for reducing the momentum of the gate comprising a pawl 63 pivotally mounted adjacent the lower portion of the frame of the gate, preferably as by a bracket 64. The pawl is preferably pivoted adjacent but below its upper end, as at 65, and its lower end 66 is weighted so that during the upward travel of the gate the pawl is maintained by gravity in a substantially vertical position, the pawl 63 preferably having a stop 67 adapted to cooperate with the bracket 64 to prevent movement of the pawl past vertical. Mounted on one of the gate posts 17 is a bracket 68 which is secured to the face of the gate post proximate to the gate. Pivotally secured to the inner or roadway end of the bracket is one end of a friction bar 69, the opposite end of the friction bar being secured to the opposite end of the bracket by a pin or bolt 70 which is slidable through a suitable aperture in the bracket, the latter end of the bar and of the bracket being held spaced apart by a compression spring 71 disposed therebetween on the bolt 69. It will be noted that the friction bar is substantially the same distance radially from the gate pivot 16 as is the pawl pivot 65.

As a vehicle approaches the gate over the mechanism 13 the wheels of the vehicle passing over the U-shaped section 40 will depress the section 40 toward the gate against the action of spring 47 and extending the spring, bringing the section into contact with the beveled slope 39 of the block 36. It will thus be seen that the U-shaped section 40 is moved through an arc slightly in excess of ninety degrees. As the U-shaped section is thus displaced, the portions 41, 42 are rotated in their bearings and the horizontally disposed lower crank arm 45 secured to the inner end of the portion 42 is moved upwardly through an arc, similarly in excess of ninety degrees. As the lower crank arm is thus moved upwardly the plunger 49, through the collar 51 which is seated against the lower edge of the sleeve 48, moves the sleeve upwardly through the arc of movement of the crank arm.

Correspondingly the rod 55 is moved upwardly, the seat 56 being brought into contact with the lower compression spring 57 effecting compression thereof against the lower edge of collar 60 which is held by the upper compression spring 59 and the inertia of the gate transmitted through the upper crank arm 35. When the lower crank arm has been moved through its entire arc it reaches the position illustrated in Figs. 3 and 9 in which the spring 57 is shown as fully compressed. Due to the compression of the spring 57 the force of the movement of the crank arm is absorbed thereby and is not initially transmitted to the rotatable shaft 20. The crank arm, having passed through the full arc of movement, has moved beyond the vertical so that, in cooperation with the remainder of the crank 33, it provides a seat from which the spring 57 may expand. The expansion of the spring 57 moves the collar 60 upwardly along the rod 55, this movement correspondingly moving the upper crank arm 35 and effecting counter-clockwise rotation of the shaft 20. As the expansion of spring 57 is substantially completed, extended return spring 47 is enabled to effect return rotation of portion 42, returning U-section 40 to vertical position. The lower crank arm 45 is returned to its horizontal position and the plunger 49 is moved downwardly, freely sliding in sleeve 48 without effecting downward movement of the sleeve, the plunger being of sufficient length to permit such travel without seating of peen 53 against shoulder 54.

Upon rotation of the shaft 20 the arm 24 is swung outwardly moving the pin 25 along the slot 26, and, upon seating of the pin against the end of the slot, effects upward and outward movement of the link 27, thus imparting an upward movement to the gate 11 which, in cooperation with the counter-balance spring 62, effects upward movement of the gate. The force of the spring continues to be exerted on the gate until it reaches the approximate mid point of its movement, in which time it has gathered the momentum of travel through an arc of about 45 degrees, which is sufficient to carry it past its point of balance to permit gravity to complete its movement to full open position. As the gate nears the full open position the pawl 63 is brought into contact with the lower surface of the friction bar 69 which, through the resistance of the spring 71, effects a braking of the speed of the gate until the gate is brought to a stop with a slight rebound, which effects movement of the pawl away from vertical, it being thereafter held by the friction bar substantially horizontal, as shown in Fig. 5. The gate is thus raised to full open position and the vehicle approaching is enabled to pass.

In its upward movement the gate carries with it the link 32 moving the arm 29 outwardly and effecting rotation of shaft 21, raising the upper crank arm 35 of mechanism 15, so that the parts of mechanism 15 are arranged similarly to the operated arrangement of the parts of mechanism 13.

The vehicle having passed the gate advances toward the departure mechanism 15 and the wheels of the vehicle pass over the U-shaped section 40 of the departure mechanism 15. The section 40 is depressed away from the gate against the action of its spring 47, bringing the section into contact with the beveled slope 38 of the block 36 on which the mechanism 15 is mounted. As the U-shaped section is thus displaced portions 41, 42 are rotated in their bearings and the horizontally disposed crank arm 45 secured to the inner end of the section 42 is moved downwardly through an arc slightly in excess of ninety degrees. As the crank arm is thus moved downwardly the plunger, through the peen 53 which is seated against the lower shoulder 54 of the sleeve, moves the sleeve downwardly through the arc of movement of the crank arm.

Correspondingly the rod 55 is moved downwardly, the upper seat 58 being brought downwardly into contact with the compression spring 59 effecting compression thereof. When the crank arm has been moved through its entire departure arc it reaches the position illustrated in Figs. 6 and 10 in which the spring 59 is fully compressed. The crank arm having passed through the full arc of movement has moved beyond the vertical so that in cooperation with the remainder of the crank 33 of the departure mechanism 15 it provides a seat from which the spring 59 may expand. The expansion of the spring 59 moves the collar 60 downwardly along the rod 55, this movement correspondingly moving the upper crank arm 35 and effecting clockwise rotation of the shaft 21, this clockwise rotation of the shaft 21 moving the arm 29 downwardly, moving the pin 30 into contact with the lower end of the slot 31 and accordingly moving the link 32 downwardly, thus effecting a downward movement of the gate 11 through the movement of the pivotal securing point of the link to the gate. This movement of the gate overbalances it so that gravity may take over and effect further downward movement of the gate. The movement of the gate is not hampered by the pawl and bar momentum brake as the pawl has either been moved responsive to rebound, or if the rebound has been insufficient is free to be moved away from the vertical as the gate moves downwardly.

Until the gate has reached approximately the mid point of its arc of vertical travel the counterbalance spring 62 is slack and exerts no effect on the gate. The gate is thus enabled to build up momentum through an arc of movement of approximately forty-five degrees, which momentum is sufficient to carry it downwardly against the action of the spring 62 after the mid-point of the arc has been passed. The action of the spring 62, however, serves to delay the gate in its downward movement and effects a braking of the speed of that movement so that when the gate has substantially reached its lowered position the spring will have slowed its movement to such an extent that the gate will seat very gently and without shock in its return to the lowered position.

During its travel downwardly the gate is held against horizontal deviation from its path by the action of the springs 19, which, as above set out, form a portion of the pivot assembly. Thus, if the gate has been struck, or otherwise moved out of its normal path, these springs will act to return it to that desired path.

When the gate has reached the lowered position it is automatically latched by the latching arrangement disposed at the end of the gate opposite its pivot. This arrangement includes a post 72 to which is secured, in suitable manner, a substantially Y-shaped upper portion 73, this portion being secured to that side of the post which is toward the gate. The Y-shaped portion 73 includes a vertical back portion 74 and oppositely disposed flanges 75, the flanges extending from the back portion toward the gate along the edges of the back portion and upwardly flaring outwardly. This Y-shaped portion is adapted to serve as a guide to assist in seating the gate in its normal position, cooperating in that regard in the above mentioned action of the springs 19.

In order to accomplish this guiding action the gate is provided at its latch end with a projection 76 rigidly secured to the outer portion of the gate frame, the projection extending from the vertical plane of the gate toward the latch post 72 and being adapted to be received by the flanges 75 and to proceed downwardly along the flared portions of the flanges into the more confined or trunk portion of the Y section.

The Y section is further provided with a substantially horizontally disposed base portion 77 adapted to serve as a latch abutment, to receive the latch member 78 rigidly secured at one end to the gate frame, as at 79, below the projection 76.

The latch member comprises a resilient leaf-spring member 80 terminating in an integral yoke portion 81, the resilient member tending to extend the upper portion of the latch away from the gate and being yieldable under applied pressure. As the gate lowers into its lowered position the leaf-spring member comes into contact with the base portion 77, further downward travel of the gate past the base portion serving to depress the resilient member 80 and permitting passage of that member past the base portion. When the gate has completed its passage the pressure on the leaf-spring member 80 is released and its resilient action moves the edges of the yoke portion 81 beneath the surface of the base portion 77, thus effecting a latching of the gate in lowered position.

An additional substantially Y-shaped member 82 is secured to the lower portion of the post 72 alined with and formed similarly to the upper Y-shaped member 73. Secured to the lower portion of the frame of the gate and projecting horizontally therefrom toward the post 72 is an additional leaf-spring member 84 which is adapted to act as a guide member received by the lower Y-shaped section during downward travel of the gate and to assist in guiding the gate to its correct position. This latter leaf spring 84 serves additionally as a shock absorber to absorb any residual jolting of the gate during descent thereof, and is further adapted to act as an impetus imparting member for local opening of the gate which may be accomplished by a foot pedal 85 pivotally secured to the post 72, as at 86, and adapted on depression of the outer or treadle end to be brought upwardly about its pivot into contact with the leaf-spring member 84 compressing the spring, which, as a result, reacts to impart an upward motion to the gate, which may in cooperation with the spring 62, effect opening of the gate independent of the vehicle actuated mechanisms.

Pivotally secured to and projecting upwardly from the pedal 85 is a push rod 87, preferably including a curved upper portion 88, the curved upper portion slidably projecting through a suitable bracket 89, and thence into contact with the resilient member 80. It will thus be seen that upon depression of the pedal about its pivot 86 the rod 87 will be raised and pressure will be applied thereto against the resilient member 80, moving it out of engagement with the base portion 77, thus effecting unlatching of the gate. Preferably the upper portion 88 is provided with a stop member 90 normally spaced below the bracket 89 and a compression spring 91 is disposed about the upper portion 88 between the bracket and the stop member. The compression spring is adapted to urge return of the push rod downwardly, the stop portion and the bracket acting as seats for the spring.

In order to effect unlatching of the gate responsive to vehicle actuation of the operating mechanism a member 92, preferably flexible, is secured to the upper portion of the yoke 81. The opposite end of this flexible member is secured preferably to a rod 93, which is slidably supported along the upper portion of the frame of the gate in suitable manner, and, at its opposite end, the rod is preferably coupled, as by a flexible member 94 to the pin 25. It will thus be seen that upon depression of the U-shaped section 40 by the passage of a vehicle thereover effecting rotation of the shaft 20, which in turn effects the sliding movement of the pin 25 along the slot 26, tension is applied to the flexible member 92 resulting in moving the latch member 81 out of engagement with the base member 77, freeing the gate for its desired upward movement, this unlatching movement being effected during the movement of the pin 25 in its slot 26 and thereby being effected before the upward movement is imparted to the gate by seating of the pin 25 against the end of the slot, through which seating the movement of the link 27, hereinabove described, is effected.

The yoke is similarly coupled to the pin 30 and is similarly operated by movement of the pin 30 in its slot 31 responsive to depression of the U-shaped section 40 of the mechanism 15 toward the gate upon passage of a vehicle thereover.

In Fig. 12 a variation of the pivot mounting for the gate is shown which is adapted for mounting the gate pivotally from a single post and in which the action of the springs 19A serves to maintain the vertical alinement of the gate in manner similar to the action of the springs 19, hereinabove described.

We claim:

1. In combination with a vertically movable gate, having means pivotally supporting said gate for vertical movement, a rotatable member having a portion oscillatably supported in substantially vertical position transverse the wheelway of the wheels of a vehicle, for depression in opposite directions by vehicles approaching and leaving said gate, said depressions respectively rotating said member in opposite directions; an elongated rotatable shaft horizontally disposed substantially parallel to said wheelway; a lower arm rigidly secured to the end of said member remote from said wheelway substantially at right angles to said portion, said lower arm being swung in opposite directions by the respective rotations of said member, an upper arm rigidly secured to said shaft, a composite pitman secured at one end to said lower arm and, spaced thereabove, having means secured to said upper arm, said pitman including a telescoping plunger and sleeve, plunger carried means engaging said sleeve to limit said telescoping and effect movement of said sleeve, and compression spring means yieldingly engaging said means secured to said upper arm to effect swinging of said upper arm and rotation of said shaft upon member-rotation swinging of said lower arm; and means coupling the opposite end of said shaft to said gate to effect said vertical movement of said gate to open position upon rotation of said shaft and return vertical movement thereof to closed position upon reverse rotation of said shaft.

2. The combination with a vertically movable gate, and means pivotally supporting said gate for vertical movement, of a rotatable member having a portion oscillatably supported in substantially vertical position transverse the wheelway of the wheels of a vehicle, for depression in opposite directions by vehicles approaching and leaving said gate, said depressions respectively rotating said member in opposite directions; an elongated rotatable shaft horizontally disposed substantially parallel to said wheelway; a lower arm rigidly secured to the end of said member remote from said wheelway, substantially at right angles to said portion, said lower arm being swung in opposite directions by the respective rotations of said member, an upper arm rigidly secured to one end of said shaft a plunger secured to said lower arm for reciprocal movement responsive to member rotation swinging of said lower arm, a sleeve slidably surrounding said plunger, means carried by said plunger engaging said sleeve upon reciprocal movement of said plunger to correspondingly move said sleeve, a collar secured to said upper arm, sleeve carried means engaging said collar to effect reciprocal movement of said collar upon sleeve movement and to effect swinging of said upper arm and rotation of said shaft upon member-rotation swinging of said lower arm; and means coupling the opposite end of said shaft to said gate to effect said vertical movement of said gate to open position upon rotation of said shaft and return vertical movement thereof to closed position upon reverse rotation of said shaft.

3. In combination with a vertically movable gate, having support means and means pivotally connecting said gate to said support means for vertical movement, a rotatable member having a portion oscillatably supported in substantially vertical position transverse the wheelway of the wheels of a vehicle, for depression in opposite directions by vehicles approaching and leaving said gate, said depressions respectively rotating said member in opposite directions, an elongated rotatable shaft horizontally disposed substantially parallel to said wheelway, a lower arm rigidly secured to the end of said member remote from said wheelway, substantially at right angles to said portion, said lower arm being swung in opposite directions by the respective rotations of said member, an upper arm rigidly secured to one end of said shaft a sleeve, a plunger linking said sleeve to said lower arm for reciprocation of said sleeve responsive to swinging of said lower arm, a rod secured to and projecting above said sleeve, a collar slidably mounted on said rod intermediate the length thereof, a spring seat secured to said rod below said collar, a compression spring interposed between said seat and said collar, said collar being secured to said upper arm, whereby to effect swinging of said upper arm and rotation of said shaft upon member-rotation swinging of said lower arm; and means coupling the opposite end of said shaft to said gate to effect said vertical movement of said gate to open position upon rotation of said shaft and return vertical movement thereof to closed position upon reverse rotation of said shaft.

4. The combination with a vertically movable gate having support means, and means pivotally connecting said gate to said support means for vertical movement of said gate; of resilient means secured to said support means, a pawl pivotally mounted on said gate, said resilient means being positioned in the path of vertical movement of said pawl, said pawl pivot being substantially radially equidistant with said resilient means from said gate pivot means, means biasing said pawl toward vertical position, said pawl slidably engaging said resilient means during upward movement of said gate to effect braking of said upward movement.

5. The combination with a vertically movable gate having support means, and means pivotally connecting said gate to said support means for vertical movement of said gate upward to open position and for return movement; of a bracket secured to said support means, resilient means carried by said bracket, a pawl pivotally mounted on said gate, said pawl pivot being substantially radially equidistant with said resilient means from said gate pivot means and lying in the same vertical plane with said resilient means, means biasing said pawl toward vertical position, stop means limiting movement of said pawl past vertical in one direction, said pawl slidably engaging said resilient means during said upward movement of said gate to effect braking of said upward movement.

6. The combination with a vertically movable gate having support means, and means pivotally connecting said gate to said support means for vertical movement of said gate upward to open position and for return movement; of a bracket secured to said support means, resilient means carried by said bracket, a bracket mounted on said gate, a pawl pivotally secured to said latter bracket, said pawl pivot being substantially radially equidistant with said resilient means from said gate pivot means and lying in the same vertical plane with said resilient means, means biasing said pawl toward vertical position, stop means carried by said pawl cooperating with said pawl bracket to limit movement of said pawl past vertical in one direction, said pawl engaging said resilient means during said upward movement of said gate to effect braking of said upward movement, return movement of said gate overcoming said biasing means to release said braking engagement.

7. In a vertically movable gate having means pivotally supporting said gate for vertical movement, means for effecting said vertical movement of said gate respectively to open and closed positions, which comprise a member oscillatably supported in and transverse to the wheelway of the wheels of a vehicle, said member being depressible by the passage of said wheels thereover in approaching said gate, and being oppositely depressible during vehicle departure from said gate and having an integral arm projecting at right angles therefrom remote from said wheelway; an elongated rotatable shaft horizontally disposed substantially parallel to said wheelway, one end of said shaft being remote from said gate and above said arm and having an arm radially projecting therefrom, the opposite end of said shaft being adjacent said gate; a plunger pivoted at its lower end to the first said arm, a sleeve, the upper end of said plunger being reciprocably housed in the lower portion of said sleeve, a rod rigidly secured to and projecting from the upper end of said sleeve, in axial alinement therewith and having a collar slidably disposed thereon intermediate its length, an upper spring seat and a lower spring seat carried by said rod, compression spring means surrounding said rod respectively interposed between said upper seat and said collar and between said lower seat and said collar, said sleeve at its lower end having an annular internal shoulder, the upper end of said plunger being peened to engage said shoulder on downward movement of said plunger, said plunger intermediate its length and spaced from said peened end having a collar adjustably secured thereto and adapted to engage said sleeve on upward movement of said plunger, and said first collar being pivotally secured to the said shaft arm, whereby to couple said member to said shaft to effect rotation of said shaft responsive to depression of said member and to effect reverse rotation thereof responsive to opposite depression thereof; and means coupling the opposite end of said shaft to said gate to effect said vertical movement of said gate to open position upon rotation of said shaft and return vertical movement thereof to closed position upon reverse rotation of said shaft.

8. In a vertically movable gate having means pivotally supporting said gate for vertical movement, means for effecting said vertical movement of said gate respectively to open and closed positions, which comprise a member oscillatably supported in and transverse to the wheelway of the wheels of a vehicle, said member being depressible by the passage of said wheels thereover in approaching said gate, and being oppositely depressible during vehicle departure from said gate and having an integral arm projecting at right angles therefrom remote from said wheelway; an elongated rotatable shaft, horizontally disposed substantially parallel to said wheelway, one end of said shaft being remote from said gate and above said arm and having an arm radially projecting therefrom, the opposite end of said shaft being adjacent said gate; a plunger pivoted at its lower end to the first said arm, a sleeve, the upper end of said plunger being reciprocably housed in the lower portion of said sleeve, a rod rigidly secured to and projecting from the upper end of said sleeve in axial alinement therewith and having a collar slidably disposed thereon intermediate its length, an upper spring seat and a lower spring seat carried by said rod, compression spring means surrounding said rod respectively interposed between said upper seat and said collar and between said lower seat and said collar, said plunger intermediate its length having a collar adjustably secured thereto and adapted to engage said sleeve on upward movement of said plunger, and said first collar being pivotally secured to the said shaft arm, whereby to couple said member to said shaft to effect rotation of said shaft responsive to depression of said member; and means coupling the opposite end of said shaft to said gate to effect said vertical movement of said gate to open position upon rotation of said shaft.

9. In a vertically movable gate having means pivotally supporting said gate for vertical movement, means for effecting said vertical movement of said gate respectively to open and closed positions, which comprise a member oscillatably supported in and transverse to the wheelway of the wheels of a vehicle, said member being depressible by the passage of said wheels thereover in approaching said gate, and being oppositely depressible during vehicle departure from said gate and having an integral arm projecting at right angles therefrom remote from said wheelway; an elongated rotatable shaft, horizontally disposed substantially parallel to said wheelway, one end of said shaft being remote from said gate and above said arm and having an arm radially projecting therefrom, the opposite end of said shaft being adjacent said gate; a plunger pivoted at its lower end to the first said arm, a sleeve, the upper end of said plunger being reciprocably housed in the lower portion of said sleeve, a rod rigidly secured to and projecting from the upper end of said sleeve in axial alinement therewith and having a collar slidably disposed thereon intermediate its length, said sleeve at its lower end having an annular internal shoulder, the upper end of said plunger being peened to engage said shoulder on downward movement of said plunger, said plunger intermediate its length and spaced from said peened end having a collar adjustably secured thereto and adapted to engage said sleeve on upward movement of said plunger, said rod carrying means for engaging said first collar respectively responsive to plunger movement, and said first collar being pivotally secured to the said shaft arm, whereby to couple said member to said shaft to effect rotation of said shaft responsive to depression of said member and to effect reverse rotation thereof responsive to opposite depression thereof; and means coupling the opposite end of said shaft to said gate to effect said vertical movement of said gate to open position upon rotation of said shaft and return vertical movement thereof to closed position upon reverse rotation of said shaft.

FREDERICK A. GUTH.
HAROLD F. GUTH.

REFERENCES CITED

The following references are of record in the file of this patent:

UNITED STATES PATENTS

| Number | Name | Date |
|---|---|---|
| 269,396 | Durnell | Dec. 19, 1882 |
| 411,505 | Knowles | Sept. 24, 1889 |
| 567,222 | Cottle | Sept. 8, 1896 |
| 1,532,987 | Bumgarner | Apr. 7, 1925 |
| 1,556,520 | Harman | Oct. 6, 1925 |
| 1,835,430 | Ritchie | Dec. 8, 1931 |